May 3, 1966  A. H. RYDLEWICZ  3,249,201
APPARATUS FOR MOVING NEWLY FORMED GLASSWARE ARTICLES
OF UNSTABLE CONFIGURATION ONTO A CONVEYOR
Filed Nov. 24, 1964  3 Sheets-Sheet 1

INVENTOR.
ALEXANDER H. RYDLEWICZ
BY
McCormick, Paulding & Huber
ATTORNEYS

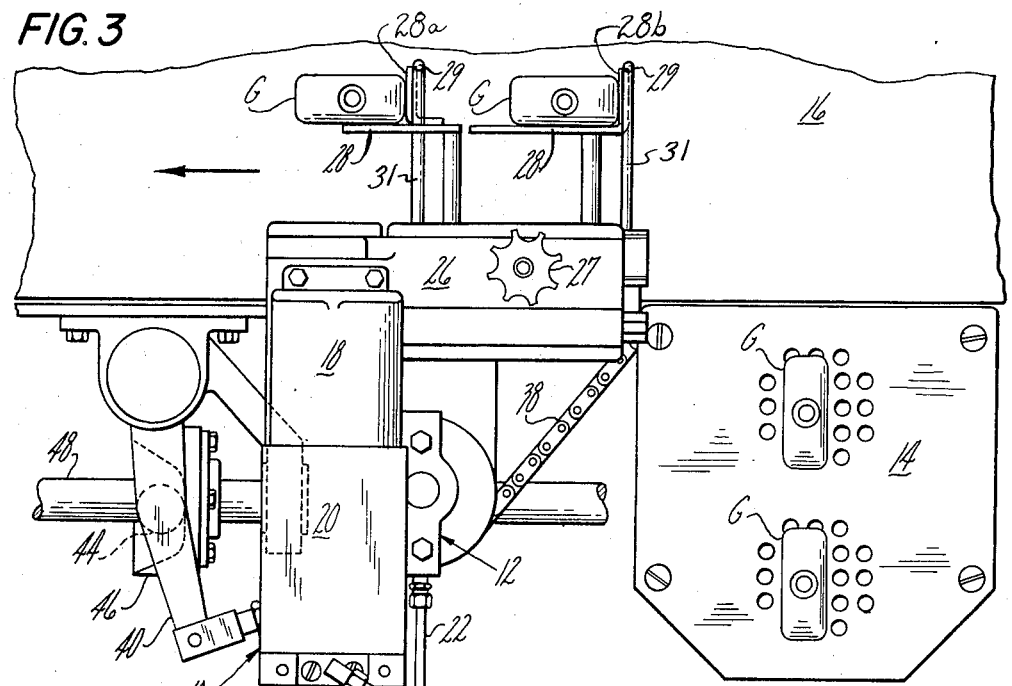
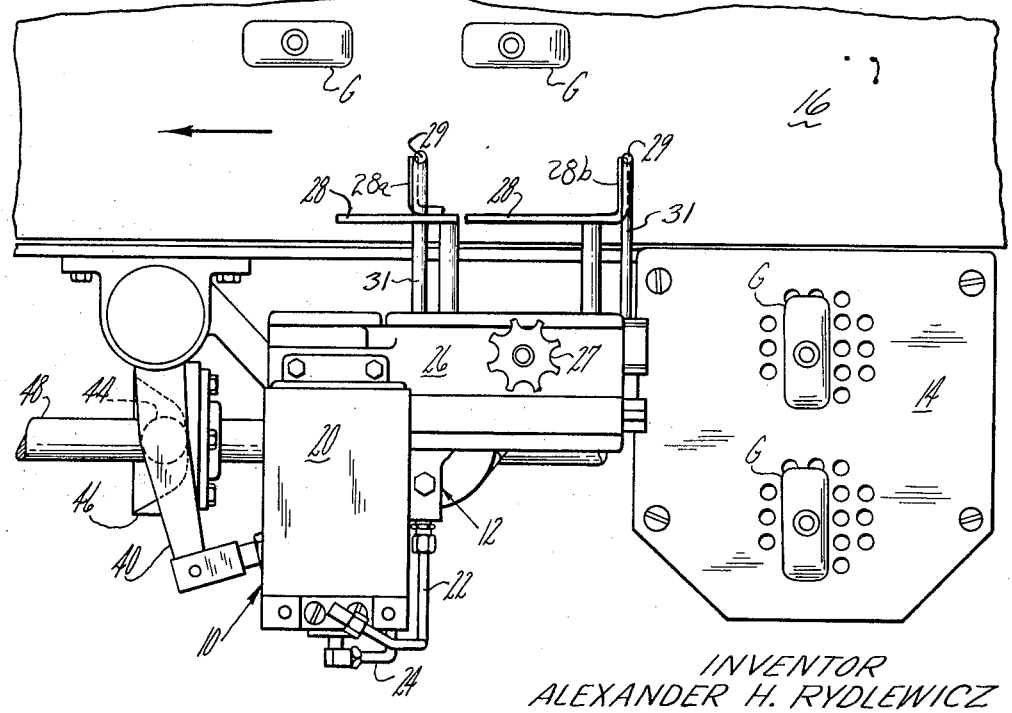

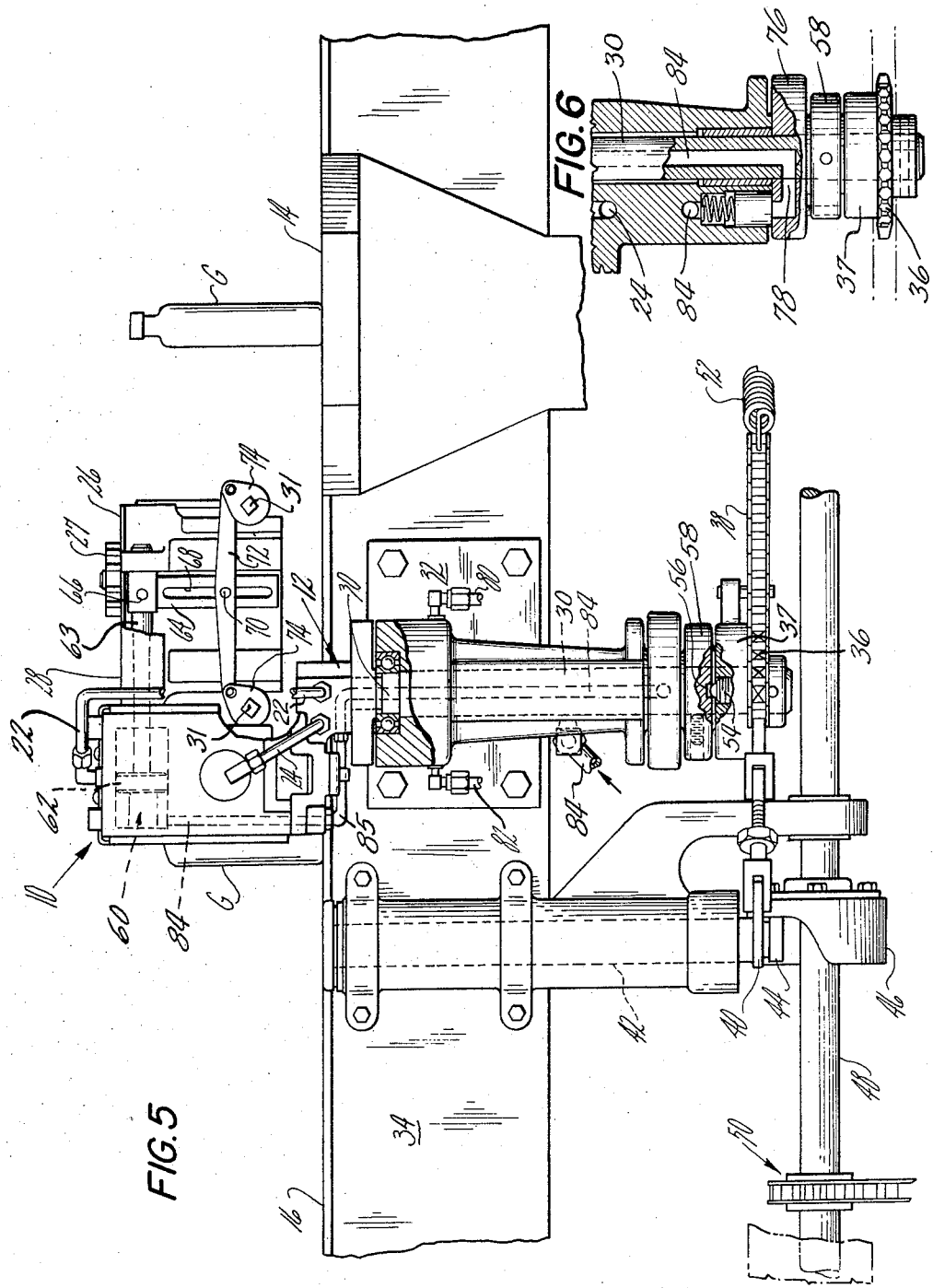

United States Patent Office 3,249,201
Patented May 3, 1966

3,249,201
APPARATUS FOR MOVING NEWLY FORMED GLASSWARE ARTICLES OF UNSTABLE CONFIGURATION ONTO A CONVEYOR
Alexander H. Rydlewicz, Manchester, Conn., assignor to Emhart Corporation, Bloomfield, Conn., a corporation of Connecticut
Filed Nov. 24, 1964, Ser. No. 413,549
7 Claims. (Cl. 198—24)

This invention relates to apparatus for handling newly formed articles of glassware or the like, and deals more particularly with an apparatus for moving glassware articles of unstable configuration onto a conveyor for advance to a lehr or to storage or to some other equipment for performing another operation on the ware.

It is the general object of the present invention to provide an apparatus capable of operating in timed relationship with a glassware forming machine, which apparatus is especially suitable for moving newly formed glassware articles having closely spaced front and rear surfaces so as to be relatively unstable in an upright position from a platform or deadplate onto a continuously moving conveyor in substantially aligned or otherwise predetermined order.

Glassware forming machines, such as the well-known Hartford I.S. machine, often comprise a plurality of sections operated by common drive means and in timed relationship with each other so that one or more articles of glassware are placed by each section on a deadplate in timed sequence and in timed relationship with similar operations in the other machine sections. The articles of glassware are preliminarily cooled and after this preliminary cooling are moved from the deadplate onto a continuously operating conveyor. The prior application, Serial No. 395,177, filed September 9, 1964, of George E. Rowe entitled Apparatus for Moving Newly Formed Glassware Onto a Conveyor discloses a suitable mechanical means for depositing glassware articles of relatively stable configuration in a steady flow onto the conveyor in evenly spaced relationship without any jamming.

In the pending application and in the device disclosed herein, an automatically operable apparatus is associated with a glassware forming machine section and is driven by the drive means common to all such sections to engage the articles of glassware on the deadplate and to then sweep the articles from the deadplate through an arcuate path onto the continuously moving adjacent conveyor at a peripheral speed substantially equal to the conveyor speed to avoid toppling. A fluid motor having a reciprocable part is positioned on a base which oscillates through a substantial angle, preferably on the order of 90°. In its extended position the reciprocable part faces the deadplate and has pocket defining means thereon adapted to engage the glassware.

In the present invention, a second fluid motor causes an outer portion of the pocket defining means to engage the rear surface of the glassware article to prevent toppling of the same as it moves through said arcuate path. The base, and first mentioned fluid motor, are then pivoted through the aforesaid angle to face the longitudinal edge of the adjacent conveyor and it will be apparent that the outer portion of the pocket defining means serves to guide the article being moved in a manner not disclosed in the above application. The outer portion is then withdrawn from its guiding position by said second motor to a position wherein the pocket defining means can be retracted and the articles released for movement along the conveyor. The base is then pivoted back to the initial position for a subsequent cycle of operation.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 3 is a view similar to FIGS. 1 and 2 but shows the first fluid motor and the pocket defining means in a pivoted position whereat they face the adjacent longitudinal edge of the conveyor, the outer portions of the latter being pivoted upwardly by the second fluid motor.

FIG. 4 is a view similar to FIG. 3 but shows the pocket defining means and the first fluid motor retracted; and FIG. 5 is a rear elevational view of the apparatus with parts thereof broken away to reveal details of the linkage between the second motor and the outer portions of the pocket defining means.

FIG. 6 is a vertical sectional view of a lower portion of the apparatus shown in FIG. 5.

Figure 1:
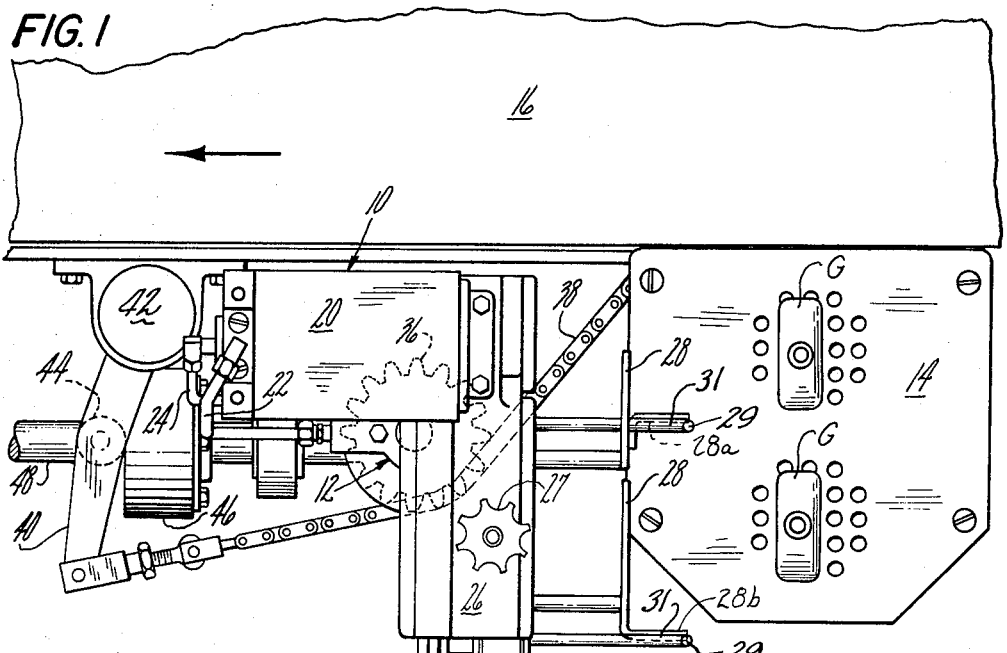
FIG. 1 is a top plan view of the apparatus provided in accordance with the present invention showing the article engaging pocket defining means and the first motor in a retracted position facing toward the deadplate.
Figure 2:
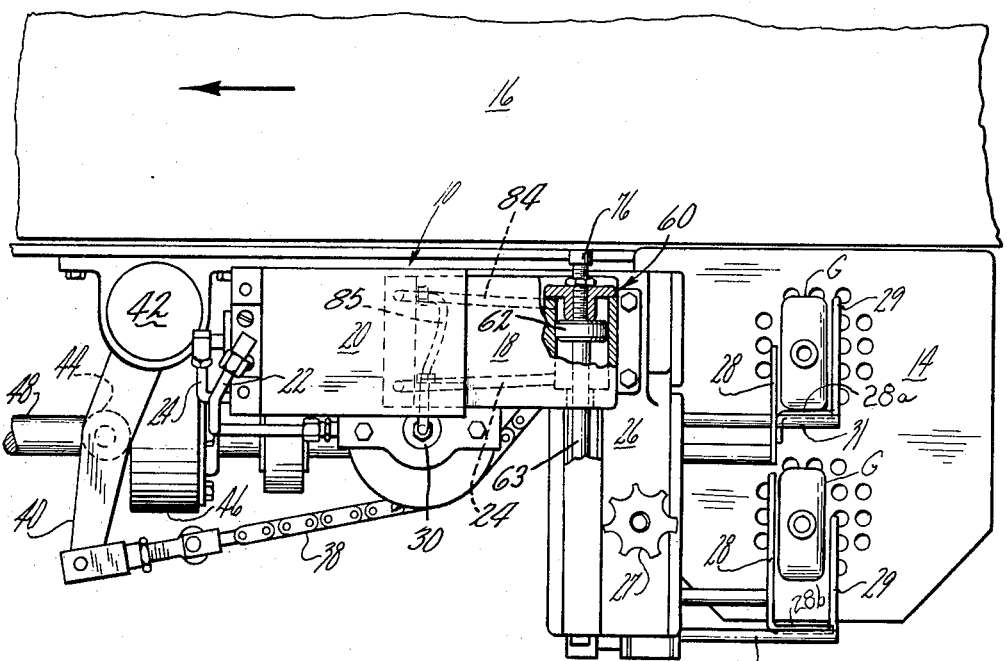
FIG. 2 is a view similar to FIG. 1 but shows the pocket defining means extended and the outer rear surface engaging portions thereof in position for guiding the articles and the second fluid motor which is operable to position these outer portions is also shown.

Turning now to the drawings in greater detain, a first fluid motor, indicated generally by the reference numeral 10, is shown attached to a rotatable base or table 12 so that the motor and the base can be positioned to face toward a stationary platform or deadplate 14, as shown in FIGS. 1 and 2, or toward the longitudinal edge of a continuously operating conveyor 16, as shown in FIGS. 3 and 4. The fluid motor 10 and its base 12 are oscillated between the aforesaid positions through a substantial angle, which is approximately 90°, the longitudinal edge of the conveyor 16 being parallel to the fluid motor 10 in its first mentioned position and being adjacent an edge of the deadplate 14.

The fluid motor 10 is preferably pneumatic and is a reversible type. That is, it includes an extensible and retractable part 18, which in the example shown is a cylinder, and a stationary part 20 which in the example shown comprises a combination housing and piston. Air lines 22 and 24 are connected between the fluid motor 10 and its base 12 so that while one carries air under pressure the other is connected to a vent and vice versa. By reversing the pressure and vent connections to the lines 22 and 24 as will be described, the part 18 is alternately extended and retracted.

The reciprocable part 18 in the air motor includes a cross member 26 which is secured at one end to the part 18 and extends generally horizontally and perpendicularly with respect thereto as shown. The cross member 26 carries a plurality of generally U-shaped pocket defining means each of which is adapted to steady an article of glassware G from three sides as shown in FIG. 2. Each pocket defining means includes an inner portion or leg 28 which is adjustably mounted on the cross member 26 and may engage the front surface of the article G or at least occupy a position in closely spaced relation thereto for steadying the same. Each inner leg also includes a projection, 28a and 28b, for engaging one of the narrow sides of the relatively unstable article as shown.

Each pocket defining means also includes an outer portion, or leg 29, which is also adjustably mounted on the cross member 26 and is adapted to engage, or nearly so, the rear surface of said article. It will be apparent that the projections, 28a and 28b, might be omitted and that a radially extending portion 31 of each outer leg 29 could engage the narrow side of the article G. It has been found, however, that due to the oscillatory motion of this outer leg 29, to be described, the extending portion 31 thereof has a tendency to wear unevenly when permitted to so engage the glassware and therefore to cause toppling of the unstable ware. This tendency is eliminated in the preferred embodiment shown by the provision of the non-oscillating angular projections 28a and 28b.

Preferably, the pocket defining means comprises two sets of legs 28, 28 and 29, 29 all of which legs are collectively adjustable vertically with respect to the cross member 26 by manual manipulation of a knob 27 to permit unstable articles of various heights to be accommodated in the apparatus shown. Horizontal pre-positioning of the legs 28, 28 and 29, 29 may be accomplished by individual adjusting means (not shown) associated with each leg so that articles of various widths can be accommodated.

It will be apparent that when the reciprocable part 18 of the motor 10 is extended into the FIG. 2 position, and when the inner and outer legs 28, 28 and 29, 29 respectively are arranged as there shown, rotation of the stationary fluid motor part 20 together with its base 12 toward the FIG. 3 position will sweep the articles G, G of glassware off the deadplate 14 and onto the conveyor 16.

It is a feature of the present invention that the outer legs 29, 29 are movable between the operative positions just described and inoperative positions wherein they cannot strike the article in said pocket defining means as the latter is extended and retracted. Preferably and as shown, the longitudinal portion 31 of each L-shaped outer leg 29 is pivotally supported in the cross member 26 so that the outer legs 29, 29 are oscillatable through a substantial angle on the order of 90° in a vertical plane from said operative position, which is substantially horizontal, and said inoperative position which is substantially vertical.

A second fluid motor 60 is mounted on the cross member 26, as best shown in FIG. 2, and the reciprocating part or piston 62 thereof is arranged horizontally and generally perpendicularly with respect to the path of reciprocation of said cross member 26.

Referring to FIG. 5, a rod or shaft 63 is connected to the piston 62 and a depending member 64 is pinned to the shaft as shown at 66. The depending member 64 defines a vertically elongated slot 68 which receives a pin 70 attached to a connecting link 72 intermediate its two ends. The link 72 is pivotally connected at either end to crank arms 74, 74 associated with each of the longitudinal portions 31, 31 of the outer legs 29, 29. As so arranged, the outer legs 29, 29 can be oscillated in a vertical plane between the positions shown in FIG. 1 and FIG. 2 through a substantial angle which is approximately 90°.

The second motor 60 has a cylindrical housing part which is attached to the cross member 26 and comprises the stationary part thereof. An adjusting screw 76 at one end of the housing limits the travel of the reciprocating piston 62, and consequently allows the arc of movement of the outer legs 29, 29 to be pre-adjusted.

The means for pivoting or oscillating the fluid motor 10 and its base 12 between the aforesaid positions includes a vertical shaft 30 as best shown in FIG. 5 which is journalled in a bracket structure 32 secured to the frame 34 over which the conveyor 16 moves. The base 12 is secured to the upper end of the shaft 30 and a sprocket 36 shown also in FIG. 1 is connected to its lower end wherein it is engaged by a chain 38. The left-hand end of the chain 38 is pivotally connected to the free end of a horizontal arm 40 which pivots about its other end on an axis coinciding with the centerline of a shaft 42 which extends vertically and which is suitably journalled on the frame 34. Intermediate its ends, the arm 40 supports a cam follow-ing roller 44 on a vertical axis, this follower being in engagement with the edge of a cam 46 which is secured for rotation with a horizontal driven shaft 48. The shaft 48 is driven by the glassware forming machine in a suitable manner, as for example, by a sprocket and chain connection 50 being extended from the shaft 48 to the drive shaft (not shown) of the glassware forming machine.

The right-hand end of the chain 38 is secured to a tension spring 52 which is anchored to a portion of the frame of the conveyor so as to maintain the cam follower 44 in continuous engagement with the camming surface on the cam 46. Thus, when the driven shaft 48 and cam 46 are in the relative position shown in FIGS. 1 and 2, the chain 38 will be moved to the left to the limiting position shown and the tensioning spring 52 allows the sprocket 36, the base 12, and the fluid motor 10 to rotate in a clockwise direction as viewed from above to a position wherein they face the deadplate 14. When the cam 46 and the shaft 48 are in the positions illustrated in FIGS. 3, 4 and 5, the spring 52 will have returned the chain to the right as far as possible, pivoting the base 12 and fluid motor 10 counterclockwise into the position shown.

Preferably the sprocket 36 is indirectly connected to the lower end of the shaft 30. That is, it is rotatable on the shaft, but a spring-loaded detent plunger 54 is provided in a hub portion 37 of the sprocket 36 for engaging a detent 56 in an annular flange 58 which is fixedly attached to said shaft 30 to effect rotation of the shaft with the sprocket. In the event of jamming, the detent plunger 54 will escape its detent 56 allowing the shaft and sprocket to slip relative to one another to avoid damage that might otherwise occur.

An annular collar 76 is releasably retained between the flange 58 and the stationary lower end of the support 32. The collar 76 can be oriented in any desired angular relationship with respect to the support 32 and a radially extending port 78 defined therein is adapted to selectively connect the second air motor 60 to a source of air under pressure which is indicated by the line 84 in FIG. 6. An air passageway is defined in the support 32 and in the hollow shaft 30 and a short air line 85 connects the hollow shaft 30 to the second air motor 60 as shown in FIG. 5. The port 78 is preferably so shaped that the motor 60 can be actuated at any time that the base is within 60 degrees of the position shown in FIG. 3.

In operation of the apparatus, the first reciprocable motor 10 is automatically extended when in the FIG. 1 position so that the part 18 together with the cross member 26 faces toward the deadplate 14. At substantially the same time, or shortly thereafter, the outer legs 29, 29 are pivoted downwardly to the FIG. 2 position wherein they are adapted to engage the rear surface of each of the articles G, G on said deadplate 14. The cam and cam follower mechanism then swing the fluid motor 10 in a counterclockwise direction as viewed in the drawings to a position facing the longitudinal edge of the conveyor 16. Just prior to reaching this position, preferably at some predetermined angular position of the base 12, the second fluid motor 60 is actuated and the outer legs 29, 29 are moved upwardly as shown in FIG. 3 into the inoperative position described above so that said legs cannot strike articles in said pocket defining means when the first fluid motor 10 is retracted. It should be noted that the outer legs 29, 29 can be rotated into their vertical positions prior to the motor 10 reaching its FIG. 3 position by orienting the collar 76 in different angular relations so that the generally rectangular bottles G, G can be oriented with their longitudinal axes at any angle relative to the direction of movement of the conveyor 16. When the fluid motor 10 has completed its 90° arc and has assumed the FIG. 3 position, the part 18 and the cross member 26 are automatically retracted to the position shown in FIG. 4.

The cam slopes on the cam 46 are designed to provide a speed of arcuate movement which is coordinated with the linear speed of the conveyor. That is, the peripheral speed of the glassware along the arc is substantially matched to the speed of the conveyor so as to minimize the possibility of toppling the glassware articles.

The automatic extension and retraction of the first fluid motor 10 is obtained by introducing air under pressure selectively to one of the motor lines 22 and 24 while venting the other thereof. When the motor 10 faces the deadplate 14, the line 24 is connected with one of two pressure lines, 80 and 82 in the base 12 while the other line 22 is connected to a vent in the base. When the motor faces the conveyor, the rotation of the base affects a connection between line 22 and the other pressure line 82 while connecting the motor line 24 to vent. The second fluid motor 60 is connectible to the other pressure line 84 through the radial port 78 and the hollow shaft 30 and the outer legs 29, 29 are thereby oscillated in timed relationship with the movements of the first motor in the manner set forth above.

The invention claimed is:

1. In apparatus for moving newly formed glassware from a deadplate onto a continuously moving adjacent conveyor, the combination comprising a first reciprocable motor having extensible and retractable pocket defining means for engaging articles of glassware, drive means for oscillating said first motor between a first position facing the deadplate and a second position facing the conveyor, first motor control means for automatically extending said pocket defining means when said motor is substantially in said first position and until said motor is substantailly in said second position and for then retracting said pocket defining means until said motor returns to substantially said first position, said pocket defining means comprising an inner leg engageable with the adjacent surface of an article of glassware as the pocket defining means is extended, an outer leg supported for movement into and out of operative position behind the article of glassware in opposition to said inner leg, a second motor for moving said outer leg, and second motor control means for moving said outer leg into operative position only when said pocket defining means has just been extended and for moving said outer leg out of operative position prior to retraction of said pocket defining means.

2. An apparatus for moving glassware as set forth in claim 1 wherein said pocket defining means comprises a plurality of inner and outer leg sets, the outer legs being movable simultaneously by said second motor control means so that a plurality of articles can be moved simultaneously from the deadplate into spaced apart positions on the conveyor.

3. An apparatus for moving glassware as set forth in claim 1 wherein said inner leg has a projecting portion which is adapted to engage the side of an article positioned between said inner and outer legs, and said outer leg being L-shaped and having an extending portion which is oscillatable about said extending portion a substantial angle between said operative and inoperative positions.

4. An apparatus for moving glassware as set forth in claim 3 wherein said pocket defining means comprises a plurality of inner and outer leg sets, said second motor being adapted to oscillate said L-shaped outer legs.

5. In apparatus for moving newly formed glassware from a deadplate onto a continuously moving adjacent conveyor, the combination comprising a first reciprocable motor having extensible and retractable pocket defining means for engaging articles of glassware, drive means for oscillating said first motor between a first position facing the deadplate and a second position facing the conveyor, first motor control means for automatically extending said pocket defining means when said motor is substantially in said first position and until said motor is substantially in said second position and for then retracting said pocket defining means until said motor returns to substantially said first position, said pocket defining means comprising a plurality of generally horizontal inner legs for engaging the adjacent surface of articles of glassware on said deadplate, said inner legs having a projecting portion for engaging the side of an article positioned adjacent said inner leg, a plurality of outer legs each of which is generally L-shaped and has an extending portion, said L-shaped outer legs being oscillatable about said extending portion through substantially a 90° angle between operative positions behind the articles of glassware in opposition to said inner legs and inoperative positions wherein they are arranged generally vertically, a second reciprocable motor having an extensible and retractable part which is movable with respect to said pocket defining means, linkage means connecting said second motor part to said outer legs for oscillatory movement thereof in response to the reciprocations of said second motor part, and second motor control means for moving said outer legs into operative positions only when said pocket defining means has just been extended and for moving said outer legs into inoperative positions prior to retraction of said pocket defining means.

6. An apparatus for moving glassware as set forth in claim 5 wherein said linkage means comprises, a plurality of crack arms each of which is secured at one end to the extending portion of one of said outer legs, a connecting link member pivotally connected to the free ends of said crank arms to restrict the same to parallel movement, a pin carried by said link member, and said reciprocable second motor part defining a slot for receiving said pin so that said outer legs can be oscillated in response to the reciprocations of said second motor part.

7. An apparatus for moving glassware as set forth in claim 5 wherein said second motor control means includes a manually adjustable mechanism for presetting control means, which mechanism is responsive to the angular displacement of said first motor with respect to said second position so that the glassware articles can be angularly oriented with respect to the direction of movement of the conveyor.

References Cited by the Examiner

UNITED STATES PATENTS 2,586,865   2/1952   Roselle _____ 198—2 X

EVON C. BLUNK, *Primary Examiner.*

EDWARD A. SROKA, *Assistant Examiner.*